US010509140B2

(12) United States Patent
Cooper et al.

(10) Patent No.: US 10,509,140 B2
(45) Date of Patent: Dec. 17, 2019

(54) BOREHOLE SHAPE CHARACTERIZATION

(71) Applicant: Halliburton Energy Services, Inc., Houston, TX (US)

(72) Inventors: Paul Andrew Cooper, Houston, TX (US); George Walter John Stevenson, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 287 days.

(21) Appl. No.: 15/520,131

(22) PCT Filed: Nov. 19, 2014

(86) PCT No.: PCT/US2014/066331
§ 371 (c)(1),
(2) Date: Apr. 19, 2017

(87) PCT Pub. No.: WO2016/080977
PCT Pub. Date: May 26, 2016

(65) Prior Publication Data
US 2017/0322332 A1    Nov. 9, 2017

(51) Int. Cl.
*E21B 47/08* (2012.01)
*E21B 47/00* (2012.01)
(Continued)

(52) U.S. Cl.
CPC ............... *G01V 1/40* (2013.01); *E21B 47/00* (2013.01); *E21B 47/08* (2013.01); *G01B 17/06* (2013.01);
(Continued)

(58) Field of Classification Search
CPC .......... E21B 44/00; E21B 47/00; E21B 47/08;
E21B 47/082; G01V 1/40; G01V 3/18;
G01V 5/04
See application file for complete search history.

(56) References Cited

U.S. PATENT DOCUMENTS 6,065,219 A     5/2000  Murphey et al.
6,671,623 B1 *  12/2003 Li ............................ G01V 3/20
                                                    324/338
(Continued)

FOREIGN PATENT DOCUMENTS

WO      02068796 A1   9/2002
WO    2013019553 A2   2/2013

OTHER PUBLICATIONS

Australian Application Serial No. 2014421065, Examination Report No. 1, dated Nov. 8, 2017, 3 pgs.
(Continued)

*Primary Examiner* — Catherine Loikith
(74) *Attorney, Agent, or Firm* — Gilliam IP PLLC

(57) ABSTRACT

The shape and size of a borehole may be characterized downhole, using measurements of the borehole shape in conjunction with a catalog of shapes against which the measured shape is matched. A unique identifier for the measured borehole shape, and optionally a size parameter, may be transmitted to a surface facility, generally saving bandwidth compared with the transmission of the raw measured borehole-shape data. Alternatively or additionally, downhole measurements may be adjusted based on the measured shape.

20 Claims, 6 Drawing Sheets

(51) Int. Cl.
*G01V 1/40* (2006.01)
*G01B 17/06* (2006.01)
*G01V 1/30* (2006.01)
*E21B 47/12* (2012.01)
*E21B 47/18* (2012.01)

(52) U.S. Cl.
CPC ............ *G01V 1/306* (2013.01); *E21B 47/122* (2013.01); *E21B 47/18* (2013.01)

(56) References Cited

U.S. PATENT DOCUMENTS

| | | | |
|---|---|---|---|
| 7,425,827 B2* | 9/2008 | Chen | G01V 3/32 |
| | | | 324/303 |
| 2006/0249307 A1 | 11/2006 | Ritter et al. | |
| 2010/0154531 A1 | 6/2010 | Han et al. | |
| 2017/0204726 A1* | 7/2017 | Lecampion | H04B 10/5561 |
| 2019/0032475 A1* | 1/2019 | Zheng | E21B 47/022 |
| 2019/0085684 A1* | 3/2019 | Fang | G01V 1/52 |

OTHER PUBLICATIONS

Canadian Application Serial No. 2,964,238; Canadian Office Action; dated Mar. 2, 2018, 6 pages.
"International Application Serial No. PCT/US2014/066331, International Search Report dated Aug. 18, 2015", 3 pgs.
"International Application Serial No. PCT/US2014/066331, Written Opinion dated Aug. 18, 2015", 9 pgs.
Canadian Application Serial No. 2,964,238; Examiner's Letter; Aug. 23, 2018, 3 pages.

* cited by examiner

BOREHOLE SHAPE CHARACTERIZATION

BACKGROUND

Fluids (e.g., oil, water, gas) trapped in geologic formations are often recovered via a well, or borehole, drilled into the formation. A drilling operation generally utilizes a drill bit attached, as part of a bottom-hole assembly (BHA), to a drill pipe suspended from a surface facility. Drilling mud may be circulated through the drill pipe, drill bit, and an annulus formed between the pipe and borehole wall to cool the drill bit and carry drill cuttings back up to the surface.

During drilling, it is often desirable to monitor the properties of the borehole and surrounding formation and fluids. For this purpose, well logging tools may be integrated into the BHA, acquiring data in real time (or near real time) at increasing borehole depths as the drill bit advances; this technique is known in the industry as "logging while drilling" (LWD) or "measuring while drilling" (MWD). Different tools may be used for different types of measurements: for example, density and neutron tools may provide information about the porosity of the formation (allowing inferences about the probability of finding oil vs. gas); gamma-ray tools may help distinguish between different types of rock (e.g., sandstone and limestone); resistivity tools may use electrical resistivity measurements to determine whether water or hydrocarbons are present; sonic tools may measure the speed of sound in the rock, which is useful in planning fracking operations; and caliper tools may determine the size and shape of the borehole. Hole shape information may be used, for example, by drilling engineers to compute the volume of cement required to complete the well, by reservoir engineers and geologists to understand downhole stresses and the orientation of break-outs and fractures, and by petrophysicists to correct formation evaluation measurements performed with other tools (e.g., resistivity and neutron-porosity tools) for the effect of standoff (i.e., the distance of the tool from the borehole wall).

The data acquired downhole by the LWD tools may be transmitted in (near) real time up to the surface for processing and evaluation. From borehole depths beyond the practicable reach of wired communication, this can be achieved, e.g., via mud pulse telemetry, a technique that involves imparting pressure variations that encode the data in binary form onto the drilling mud. This mechanical form of transmission is subject to significant bandwidth limitations; in many implementations, data transmission rates are in the range from only three to ten bits per second. Accordingly, different logging tools may compete for bandwidth, and the information update rate provided by a given tool may be throttled to allow other data to be transmitted between successive updates.

DESCRIPTION

Disclosed herein are systems and methods for characterizing the shape of a borehole downhole by matching measured hole shapes against a catalog of possible hole shapes stored in downhole memory. This categorization can contribute in two ways to preserving scarce transmission bandwidth: In some embodiments, the downhole characterization facilitates conveying borehole-shape information to the surface in compressed form, for example, in terms of an identifier of the catalog entry matching the measured hole shape, optionally in conjunction with one or more quantitative parameters. Further, in some embodiments, the identified borehole shape enables decision-making downhole, eliminating the need to send the data up-hole altogether. By allowing the available bandwidth to be used more efficiently, the approach described herein facilitates taking better advantage of the wealth of information that can be acquired downhole in real time. Accordingly, various embodiments improve over previous systems and methods for characterizing borehole shapes, thereby improving the drilling process as a whole.

Figure 1A:
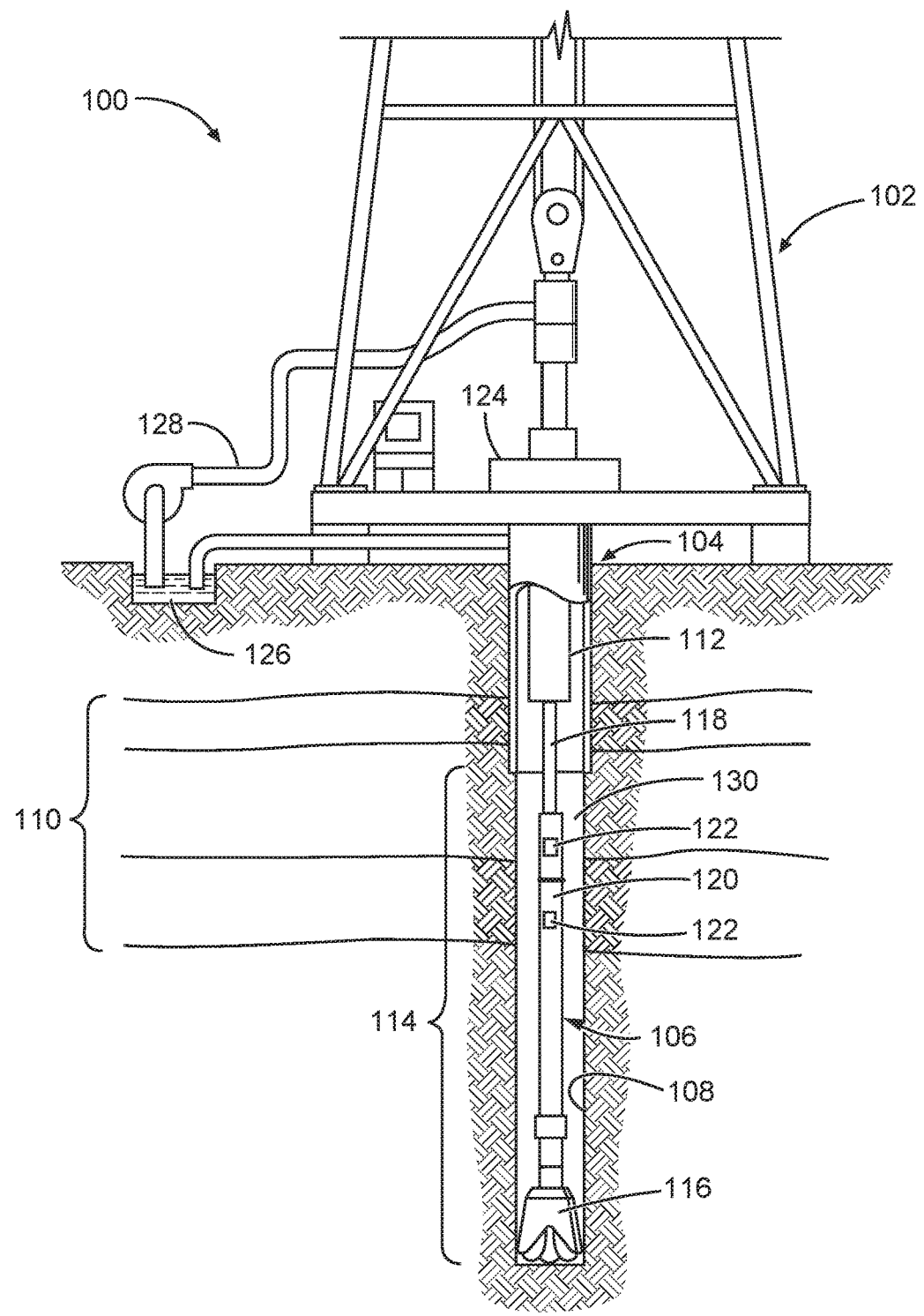
FIG. 1A is a schematic diagram of a drilling system adapted for MWD/LWD operations, in accordance with various embodiments.

While the apparatus and methods described herein are generally applicable to both wireline logging and MWD/LWD operations, the compression of hole-shape information in accordance herewith is particularly advantageous for the latter, as the transmission of data during a drilling operation is often subject to bandwidth limitations, as described in the background section above. Accordingly, to provide some context, FIG. 1A illustrates an example system 100 for measuring the borehole shape during a drilling operation.

The system 100 includes a drilling rig 102 located at the surface of a well 104 and, supported by the drilling rig 102, a drill string 106 for drilling a borehole 108 through subsurface formations 110. The drill string 106 includes a drill pipe 112 and, generally located at the lower end of the drill pipe 112, a BHA 114. (Note that the drawing is not to scale, and that, once a borehole of significant depth has been drilled, the drill pipe 112 is typically much longer than the BHA 114.) The BHA 114 may include the drill bit 116, which operates to create the borehole 108 by penetrating the surface and subsurface formations 110, one or more drill collars 118, which serve to put weight on the drill bit 116, and a downhole tool 120 including a number of different tools and instruments, including one or more MWD/LWD tools 122. During drilling operations, the drill string 106, may be rotated by a rotary table 124, and drilling mud may be pumped from a mud pit 126 through a hose 128 into the drill pipe 112 and down to the drill bit 116 to cool and lubricate the drill bit 116. The drilling mud usually flows out from the drill bit 116 and returns to the surface through an annular region 130, carrying drill cuttings with it. The BHA 114 may rotate along with the drill string 106. Alternatively or additionally, the BHA 114 may be rotated by a top drive or a motor (e.g., a mud motor) that is located downhole. As the BHA 114 rotates, the tools 122 included therein may measure various quantities of the borehole and surrounding formation. By tracking the rotational position of the BHA, time series of such measurements can be converted to azimuthal data, as is familiar to those of ordinary skill in the art.

In accordance with various embodiments, borehole shape measurements provide azimuthal radius or standoff data, which means that the radial distance of the borehole wall from a centerline through the borehole, or from the caliper device (whose distance from the centerline is presumed to be known), is recorded as a function of the azimuthal angle about the centerline, measured in a cross-sectional plane of the borehole perpendicular to the centerline. (Since the borehole is generally not of perfectly circular shape, there is, of course, no unique centerline. Thus, the term "centerline" as used herein denotes any axis located at an approximate center of the more or less circular borehole. In general, measurements taken for different borehole cross sections reference the same continuous centerline through the borehole or at least through a portion thereof. Furthermore, the term "radius" is herein used to denote the distance between the borehole wall and the centerline (perpendicular to the centerline) and does not presume a circular shape.)

Borehole shape or standoff measurements can be made in many ways. Common methods include the use of mechanical calipers that follow the contour of the borehole and the use of acoustic/ultrasonic calipers that measure the time it takes pressure waves to travel from the tool to the formation wall and back. Another method is to use a gamma-gamma density tool. These tools contain a source of gamma rays, as well as detectors that sense gamma rays scattered in the formation and back from the formation into the tool. Besides measuring the formation density, these tools commonly determine a quantity known as the density correction, which depends on standoff, mud weight, and formation density. By measuring the formation density and the mud weight separately, standoff can be computed from the density correction.

Figure 1B:
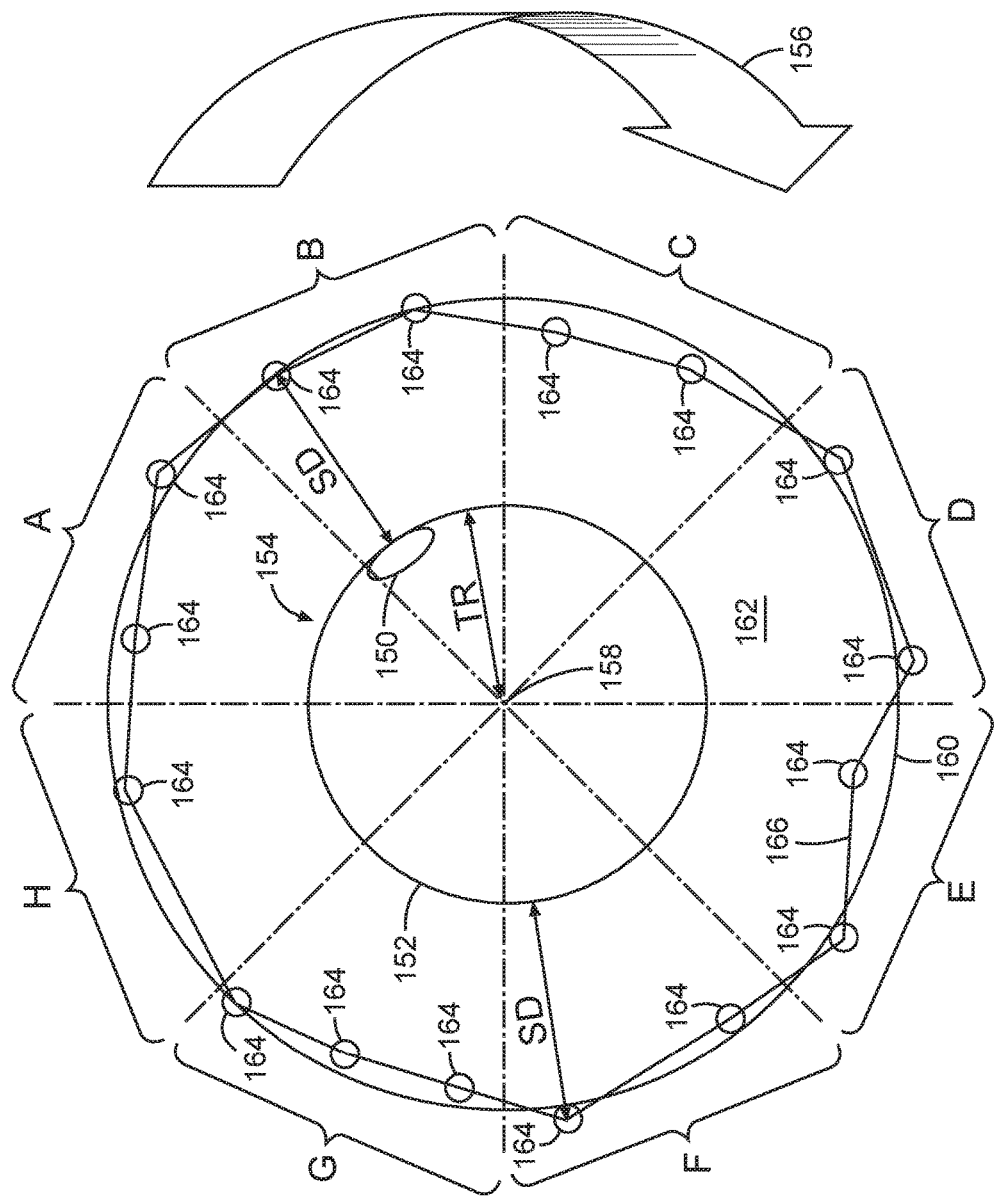
FIG. 1B is a cross-sectional view of a borehole and a logging tool used therein, illustrating the measurement of standoff data in accordance with various embodiments.
Figure 2A:
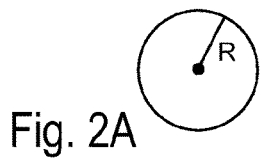
FIGS. 2A-2F are cross-sectional views of various example borehole shapes.

FIG. 1B illustrates azimuthal standoff measurements as acquired by a single rotating transducer (e.g., a pulse-echo ultrasound caliper device as is well-known to those of ordinary skill in the art), in accordance with an embodiment. While the transducer 150, mounted proximate to the face 152 of a downhole tool 154, is rotated in an azimuthal direction 156 about the centerline 158 of the borehole 160, ultrasonic energy is transmitted and received by the transducer 150. The time between launching the signal (e.g., the "IP" or initial pulse) and receiving its return, along with the speed of sound in the propagation medium 162, can be used to determine the standoff distance SD, as is well known to those of ordinary skill in the art. If the central axis of the downhole tool 154 is aligned with the centerline 158 of a cylindrical borehole 160 (as shown in FIG. 1B), the standoff distance SD plus the radius of the tool TR gives the radius of the borehole 160 at the point the measurement is taken. If standoff data 164 (e.g., comprising standoff distance SD measurements) is acquired throughout one complete revolution of the downhole tool 154 the actual contour 166 of the borehole wall (which is likely not perfectly cylindrical as shown for the ideal borehole 160) at the transducer elevation may be obtained. It should be noted that, while pulse-echo transducers are described for simplicity herein, a pitch-catch transducer pair (e.g., comprising separate transmitting and receiving transducers) can also be used for the acquisition of standoff data 164. The borehole standoff data 164 may be segregated, or grouped, into a plurality of azimuthal bins; in the depicted example, eight bins A-H are shown. However, in general, any number of bins may be used. In many embodiments, the number of bins is even (e.g., 6, 8, 10, 12, 14, 16, etc.), allowing borehole diameters to be derived from the borehole standoff data in opposing ones of the plurality of azimuthal bins.

Figure 3A:
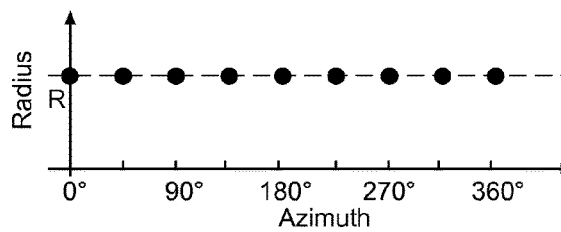
FIGS. 3A-3F are graphs of the borehole radius plotted versus the azimuthal angle for the borehole shapes depicted in FIGS. 2A-2F.
Figure 2B:
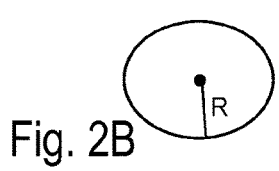
Figure 3B:
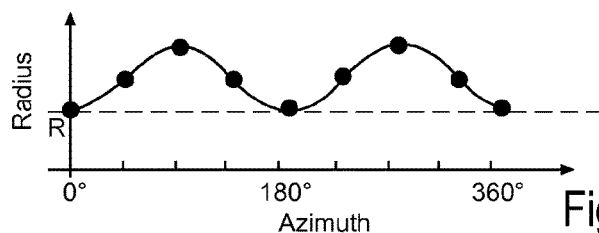
Figure 2C:
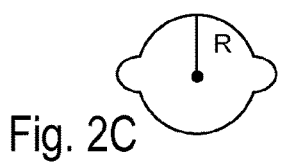
Figure 3C:
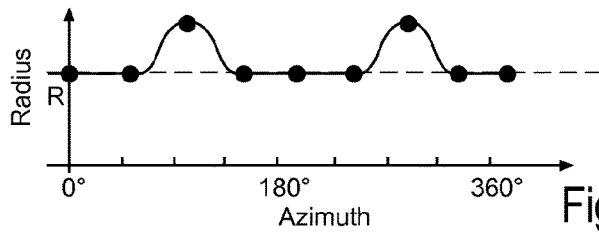
Figure 2D:
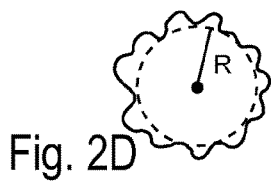
Figure 3D:
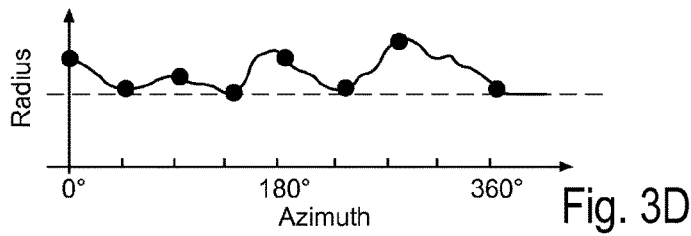
Figure 2E:
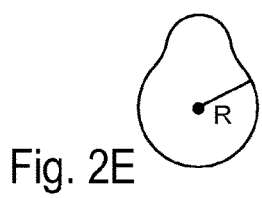
Figure 3E:
Figure 2F:
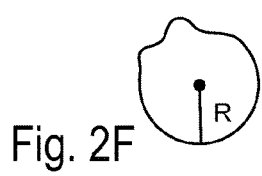
Figure 3F:
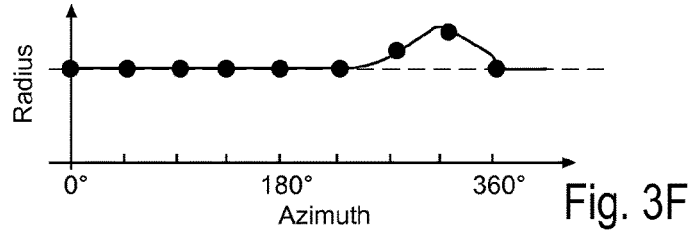

FIGS. 2A-2F illustrate various characteristic borehole shapes that are frequently encountered in borehole shape measurements: circle (FIG. 2A), ellipse (FIG. 2B), break-out (FIG. 2C), rugose shape (FIG. 2D), keyseating (FIG. 2E), and cave-in (FIG. 2F). Example azimuthal radius data corresponding to each of these six shapes are plotted in FIGS. 3A-3F for eight bins centered at azimuth angles of 0°, 45°, 90°, 135°, 180°, 225°, 270°, and 315°. As can be seen, for a perfectly circular hole shape, the radius is constant across all bins (FIG. 3A), whereas for shapes deviating from perfect circularity, the radius generally varies between a "nominal" radius R (which may be equal to or minimally larger than the drill bit radius) and larger radii (as may result from wobbling of the drill bit or from fracturing, breakouts, etc. in the borehole wall). The radial variation may be gradual and smooth, such as for an ellipse (FIGS. 2B and 3B), or more or less random and erratic, such as for a rugose hole (FIGS. 2D and 3D). Further, the radius may vary over the entire azimuthal angular range from 0° to 360°, such as for an ellipse or rugose hole, or the deviation from a constant radius may be confined to a small angular range, such as for the keyseating shape (FIGS. 2E and 3F) or the cave-in shape (FIGS. 2F and 3F), or to a few (e.g., two) small angular ranges, such as for the break-out hole (FIGS. 2C and 3C). Of course, borehole shapes are not limited to the six examples shown, but can be further characterized and grouped into any number of shape-dependent categories. Furthermore, as explained in more detail below, a borehole shape that fits within any of the predetermined categories may be further characterized with parameters specific to the category, such as, the eccentricity and/or orientation of an ellipse, the size and/or angular position of a breakout, etc.

Figure 4A:
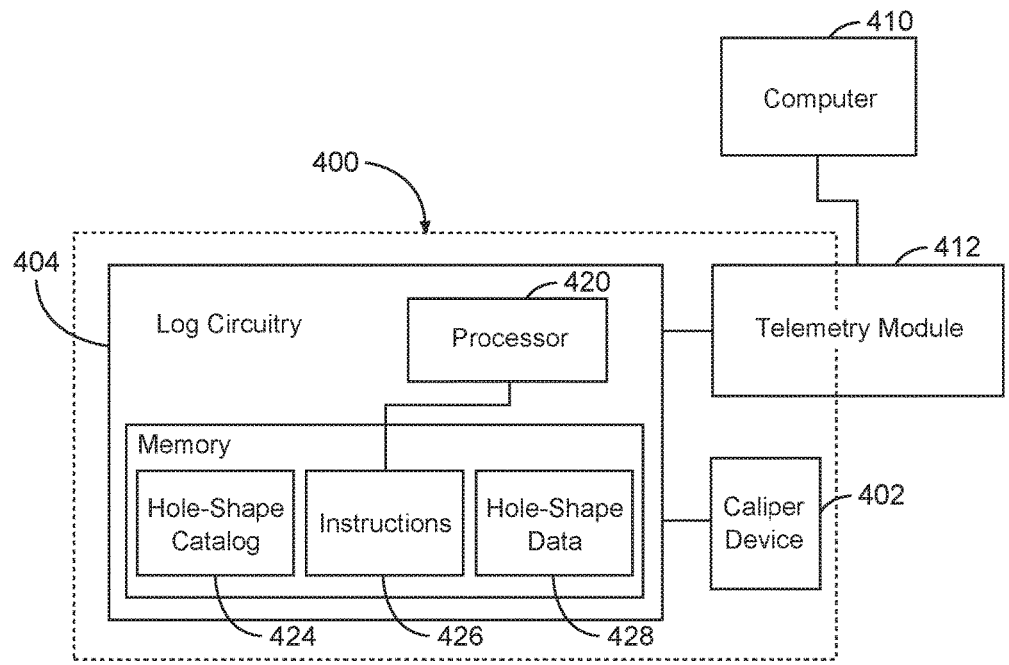
FIG. 4A is a block diagram of a system including a well-logging tool and surface facility in communication therewith, in accordance with various embodiments.

FIG. 4A conceptually illustrates an example well-logging tool 400, in accordance with various embodiments, for acquiring, processing, and transmitting borehole caliper measurements (e.g., radius or standoff measurements). The tool 400 generally includes one or more caliper devices 402, such as, for example, a rotating transducer (e.g., as described with respect to FIG. 1) or a gamma-gamma density tool. (The term "caliper device" is herein used broadly to include any sensor or device used to azimuthally sample a cross-sectional parameter, e.g., a radius or standoff distance, or otherwise measure the cross-sectional shape of a borehole.) Further, the well-logging tool 400 includes logic circuitry 404 coupled to the caliper device(s) 402 for processing signals received therefrom. The logic circuitry 404 may generally be implemented using any suitable combination of hardware (e.g., hardwired circuits), firmware, and/or software. To facilitate communications with an above-ground computer 410, the well-logging tool 400 may also include, and/or be coupled to, a telemetry module 412. The telemetry module 412 may, for instance, include one or more antennas (e.g., in the form of solenoids) for the wireless exchange of electromagnetic signals with the computer 410. Alternatively, the telemetry module 412 may include a mud pulse generator that imparts pressure pulses onto the drilling mud column, which are received at the surface by a detector in communication with the computer 410. The mud pulse generator may be provided, in its entirety or in part, separately from the well-logging tool 400. For example, in some embodiments, a valve structure and associated drive mechanism (e.g., motorized gear system) of the mud pulse generator constitute separate components, and a signal encoder integrated in the logic circuitry 404 of the well-logging tool converts the data to be transmitted into a format suitable as input to the drive mechanism. Other means for the transmission of data and/or control signals between the above-ground computer 410 and the well-logging tool 400 may also be used.

In various embodiments, the logic circuitry 404 includes one or more general-purpose and/or special-purpose processors 420 (such as an ARMS or other reduced-instruction-set-computing (RISC) processor, a digital signal processor, a field-programmable gate array, etc.) and memory 422 in communication therewith. The memory 422 stores the catalog 424 of hole shapes (described in more detail below) and, in embodiments implementing processing functionality at least in part with software, instructions 426 to be executed by the processor(s) 420. In some embodiments, the memory 422 further logs the (raw or processed) borehole-shape data 428. Depending on its particular use, the memory 422 may be or include read-only memory (ROM) and/or writable memory (such as, without limitation, flash memory, electrically erasable programmable read-only memory (EEPROM), battery-powered random-access memory (RAM) memory, mechanical memory devices such as disk drives, etc.). In general, at least a portion of the memory (including the portion storing the hole-shape catalog 424) is non-volatile. In some embodiments, the memory 422 includes multiple memory devices and/or types of memory.

Figure 4B:
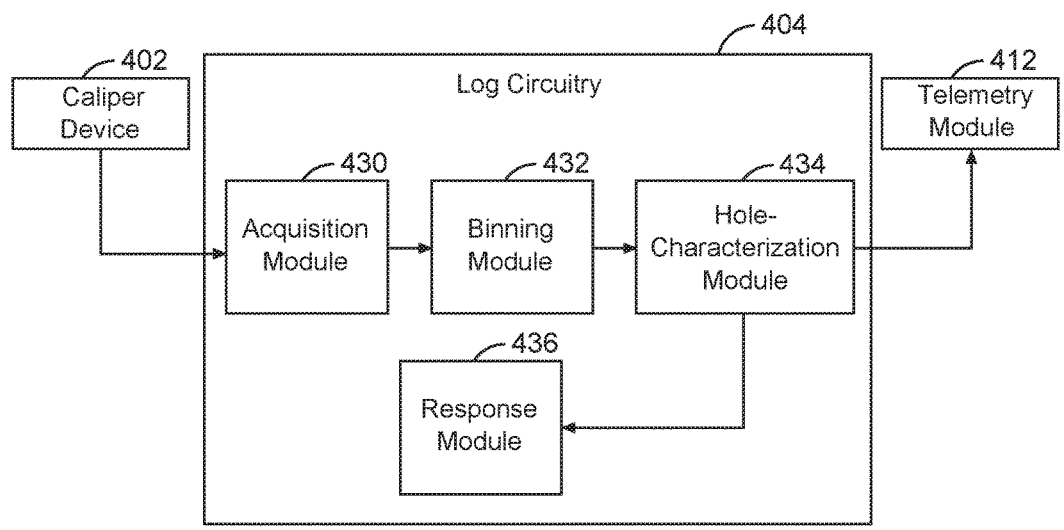
FIG. 4B is a block diagram of the functional processing components of the well-logging tool of FIG. 4A, in accordance with various embodiments.

FIG. 4B conceptually illustrates various functional modules implemented by the logic circuitry 404 (e.g., collectively by the processor(s) 420 and memory 422). As shown, an acquisition module 430 may digitize or otherwise pre-process the signals received from the caliper device(s) 402, and optionally store them for later analysis. A binning module 432 may segregate the measured cross-sectional parameter (e.g., standoff) data into a plurality of azimuthal bins, based on knowledge of the angular positions of the caliper device 402 at the time of respective parameter measurements. A hole-characterization module 434 may then compare the binned data against the shape templates stored in the hole-shape catalog 424 to identify the shape that most closely matches the measured borehole shape. To facilitate such comparisons, the measured data and the shape templates are generally segregated into the same number of bins (e.g., eight bins in the example of FIGS. 3A-3F). The hole-shape characterization module 434 may also determine a parameter indicative of the overall size of the borehole (e.g., a minimum radius or diameter). The size parameter and a catalog identifier associated with the matching catalog shape may be transmitted to the above-ground computer 410 by the telemetry module 412. Alternatively or additionally, a response module 436 may determine an action to be taken based on the determined shape of the borehole, such as, for instance, an adjustment to be made to the sampling rate or operation mode of the well-logging tool 400 or other tools included in the BHA. In some embodiments, the size parameter and catalog identifier are stored in the memory 422 for later retrieval and analysis, e.g., for the purpose of detecting any errors that may have occurred during data encoding/decoding and/or transmission. Further, in some embodiments, catalog identifiers and size parameters are sent to the surface in real-time, while the raw data is stored in downhole memory for more detailed processing at the surface at a later time.

Figure 5:
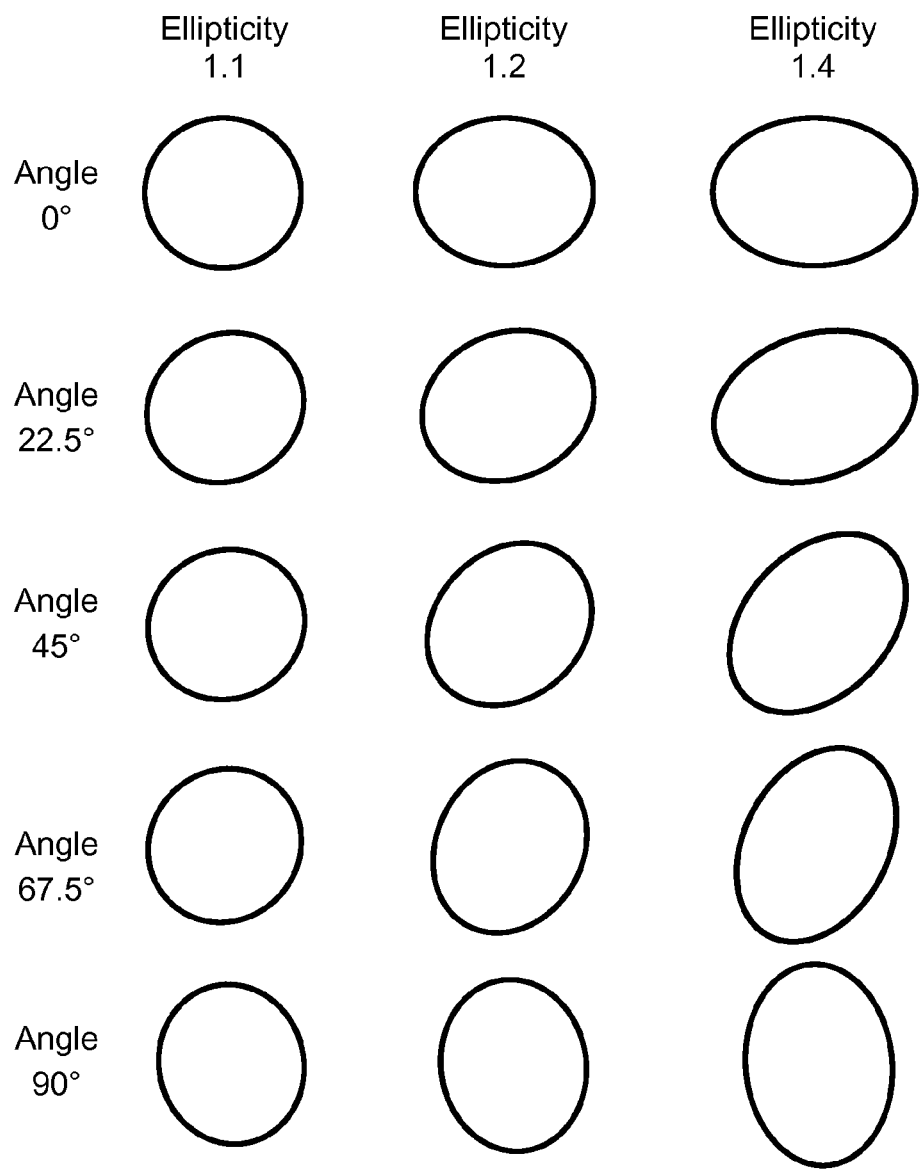
FIG. 5 is a chart of an elliptical borehole cross-section for a range of angle and ellipticity parameters, in accordance with various embodiments.

As indicated, the hole-shape catalog 424 includes entries for each of a plurality of pre-determined hole shapes. These hole shapes may be grouped into a number of high-level hole shapes, which may include, without limitation, the six shapes illustrated in FIGS. 2A-2F (i.e., circle, ellipse, breakout, rugose shape, keyseating, and cave-in), or a subset thereof. Within each group, the catalog may have multiple templates that differ from each other in the values of one or more parameters of the high-level hole shape. For example, as shown in FIG. 5, elliptical hole shapes may further be characterized based on the combination of their ellipticity (i.e., the degree of deviation from a circle, as quantified, e.g., in terms of the eccentricity, which is given by $\varepsilon=\sqrt{1-b^2/a^2}$, where a and b are the semimajor axis and the semiminor axis of the ellipse, respectively, or in terms of the ratio between a and b (which is indicated in FIG. 5)) and their orientation (specified, e.g., in terms of the angle of the semimajor axis relative to an arbitrarily chosen, fixed direction). Similarly, for breakouts and keyseating shapes, the azimuthal angle at which the deviation from circularity occurs and/or the magnitude of the deviation (e.g., in terms of the ratio between the farthest distance from the hole wall to the center and the nominal radius) may be used as parameters further characterizing hole shapes within these high-level categories. For cave-ins, three parameters, including the angular and radial extent of the deviation from circularity and its center position may be used. For a rugose hole, the standard deviation of the measured azimuthal radii may be a parameter of interest. In general, the descriptive parameters used to refine the hole-shape templates within their respective high-level categories, and the granularity (or number) of values for each of these parameters, may be selected in various ways, depending, e.g., on the level of detail about hole shapes that is desirable under the circumstances of the particular application.

Each entry in the hole-shape catalog may include a unique identifier as well as the template data itself. The identifier may be a number (e.g., an integer), letter or other symbol, or a combination thereof. In some embodiments, the identifier has multiple components, for instance, a first number identifying the high-level hole shape (such as 1, 2, 3, 4, 5, or 6 for the six shapes illustrates in FIGS. 2A-2F) and a second number identifying the lower-level shape within the high-level category. (Alternatively, for multiple parameters, a separate component of the identifier may be used for each parameter. For example, with reference to FIG. 5, an ellipse oriented at 45° with an ellipticity of a/b=1.1 may have the unique identifier 2-3-1, where 2 indicates the high-level shape, 3 identifies the third angle, and 1 the first ellipticity within the grid of shapes.) In other embodiments, the hole-shape identifier is a single number, and different ranges of numbers correspond to different high-level hole-shapes. (For example, 0 may stand for a circle, 1-20 for an ellipse, 21-40 for a break-out, etc.)

The template for each entry generally includes a sequence, or vector, of values of a particular cross-sectional parameter (e.g., the radius) for a number of predetermined azimuthal bins. In some embodiments, the stored shape templates include data for a rather large number of bins (e.g., 32), and if, during caliper measurements, the acquired azimuthal data is divided into fewer (e.g., 16 or 8) bins, the template data is averaged across the applicable number of adjacent bins (e.g., across groups of two or four bins). The averaged template may be computed on the fly (e.g., by the hole-characterization module 434), or stored in the catalog along with the more fine-grained template. The various templates are generally normalized to a uniform borehole size. For example, the cross-sectional parameters for a given template may all be normalized by the smallest radius to obtain nominal radii of unit length.

Figure 6:
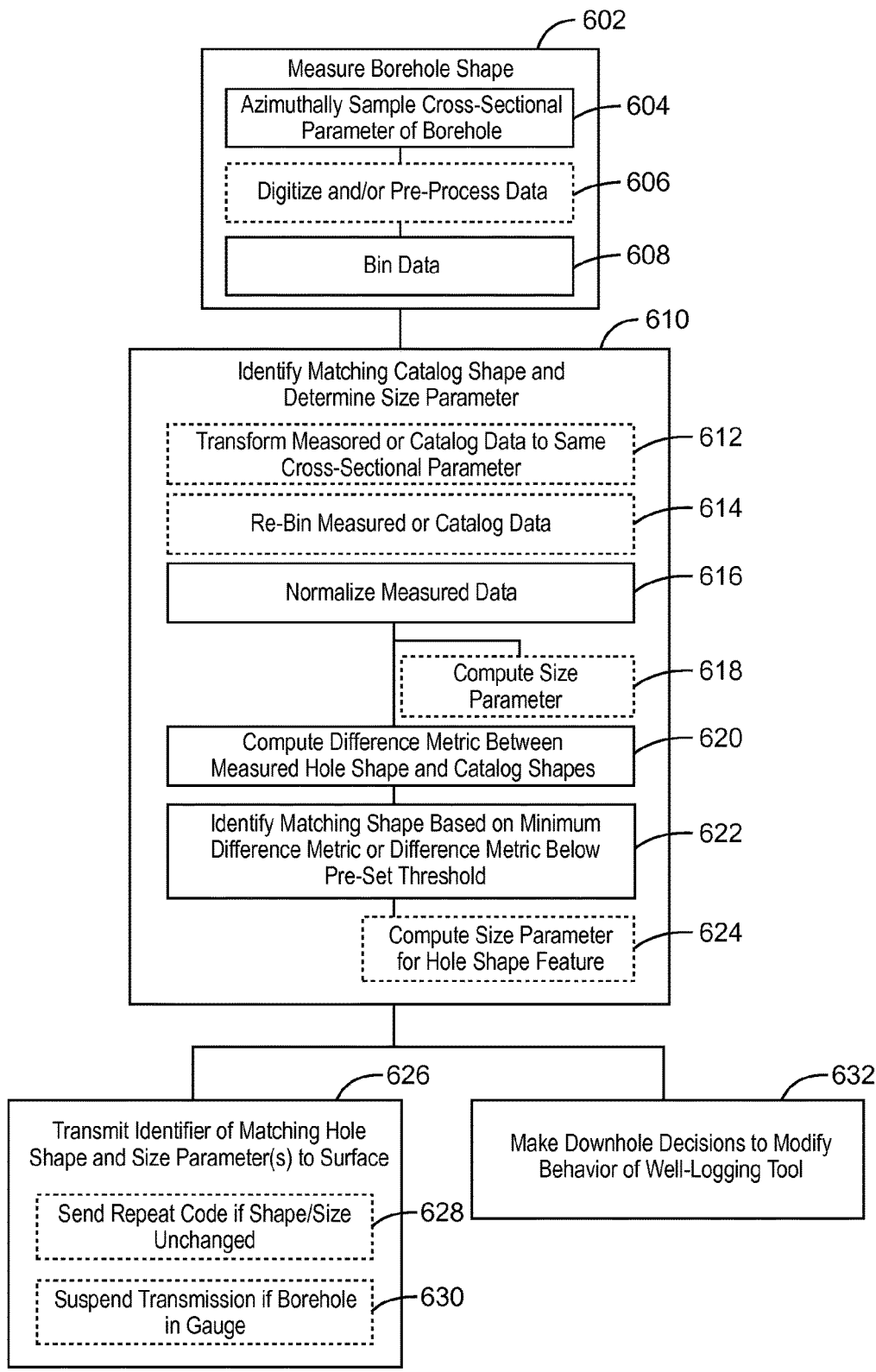
FIG. 6 is a flow chart of a method for characterizing a borehole shape in accordance with various embodiments.

FIG. 6 illustrates a method 600 for characterizing borehole shapes in accordance with various embodiments in the form of a flow chart. The method 600 includes measuring the borehole shape with a well-logging tool (e.g., tool 400) (602), which may involve azimuthally sampling a cross-sectional parameter of the borehole with one or more caliper devices (604), digitizing or otherwise pre-processing the acquired data if and as necessary (606), and azimuthally binning the data (608). The method 600 further includes comparing the measured borehole shape against the catalog to identify a matching shape, and determining a parameter indicative of the size of the borehole (610). If the measured cross-sectional parameter is not the same as the cross-sectional parameter stored in the catalog templates—for example, if standoff data are measured whereas the catalog stores hole shapes in terms of radial data—the measured or catalog data is, in preparation for the comparison, transformed (for example, by adding the caliper distance from the centerline of the borehole to the standoff data) to obtain measured and catalog values for the same parameter (612). Further, if the number of azimuthal bins differs between the measured and catalog data, data is aggregated across and/or interpolated between bins, as needed, to obtain equal numbers of bins (614). In general, to eliminate the effect of overall different borehole sizes, the measured data may be normalized to the same nominal radius as the catalog data (616); for example, if the catalog data is normalized to a nominal radius (i.e., smallest radius within each cross-section) of unit length, the measured radial values for a given cross-section are all divided by the minimum radius measured for that cross-section. The normalization factor—i.e., in the example, the minimum measured radius for the cross-section—inherently provides a parameter characteristic of the size of the borehole. In some embodiments, it may be beneficial to compute a different size parameter from the normalization factor and/or other information (618). For example, instead of measuring the borehole size in absolute terms (such as in terms of the minimum radius of the borehole), the borehole size may be characterized relative to a reference dimension, such as the radius of the drill bit, the inner radius of a drill pipe section, etc. In some embodiments, normalization is not used.

Once the measured data has been normalized and/or transformed in a manner suitable for comparison with the catalog, the best-matching catalog entry is identified. This may involve computing a metric of the difference between the measured data and the catalog data for all, or at least a subset, of the catalog templates (620), and a matching shape is determined based thereon (622). In various embodiments, the difference metric is a function of the pairwise differences between the cross-sectional parameter values in corresponding azimuthal bins; for example, the difference metric may be the sum of the squares, the sum of the absolute values, or the square root of the sum of the squares of these differences, etc. In alternative embodiments, the difference metric is a function of the pairwise ratios between the cross-sectional parameter values for corresponding bins. In general, various suitable difference metrics will be readily apparent to those of ordinary skill in the art.

In some embodiments, the difference metric is computed for all catalog entries, and the entry that minimizes the metric is taken to be the best-matching catalog shape. In other embodiments, difference metrics are computed for various catalog entries in a selected order, and when the computed metric for a particular entry falls below a pre-set threshold, corresponding to a certain degree of similarity between the measured borehole shape and the catalog shape for that entry, the identified catalog shape is taken to be a match for the measured shape. The order in which difference metrics are computed for various catalog entries may depend on the relative complexity of the corresponding shape templates. For example, the hole-characterization module 434 may first attempt to match the measured borehole shape to a circle, then proceed to an ellipse, then a breakout or keyseating, etc., going from simpler to increasingly complex shapes (e.g., where increasing complexity generally corresponds to an increasing number of descriptive parameters used to characterize the shapes). Alternatively, the comparison may start with a (low-level or high-level) catalog shape identified as matching the previous (or, more generally, one of a group of recent) measured shapes. If the borehole shape does not significantly change from one measurement to the next (which it generally will not), this approach helps finding a matching catalog shape within a small number of iterations, saving computation time. Similarly, performing hole-shape comparisons in the order of increasing complexity serves to conserve computational resources.

As illustrated in FIG. 5, the catalog may include separate entries for various orientations of each hole shape. Alternatively, the catalog may store each shape for only one orientation. For instance, for elliptical hole shapes, the catalog may include multiple entries for different levels of ellipticity, but all of these entries may correspond to a semimajor axis at a 0° angle (corresponding to the first row depicted in FIG. 5). In this case, comparisons of the measured borehole shape with the shape template will involve cyclically shifting the azimuthal bins of either the template shape or the measured shape, and computing the difference metric for each position within the cycle. For example, if the cross-sectional parameter is segregated into eight azimuthal bins, eight difference metrics may be computed from pairwise differences between the catalog data in bins 1 through 8 and (i) the measured data in bins 1 through 8 (in this order); (ii) the measured data in bins 2, 3, . . . , 8, 1 (in this order); (iii) the measured data in bins 3, 4, . . . , 8, 1, 2; and so forth. The smallest of these eight difference metrics will correspond to the best angular alignment between the measured shape and the catalog shape. Accordingly, by cyclically shifting the azimuthal bins, it is possible to determine the orientation of the measured borehole shape even if the catalog itself does not account for different orientations.

Furthermore, identifying a matching hole shape may inherently quantify a characteristic feature of the borehole shape. For instance, by matching a measured borehole shape to one of the elliptical cross-sections in FIG. 5, the level of ellipticity is specified. Similarly, the dimensions of a breakout can be ascertained if the measured shape is matched against a plurality of breakout templates with different maximum radii relative to the nominal (e.g., unit-length) radius of the borehole shape. In some embodiments, however, the size of the characteristic feature may be determined computationally from the measured data with greater accuracy than is achievable based on comparison with the catalog shapes alone. For example, the ellipticity of an elliptical borehole may fall outside the range of values included in the catalog, but once the measured borehole has been characterized as elliptical, its ellipticity may be calculated from the data (e.g., from the minimum and maximum measured radii). Accordingly, in various embodiments, characterizing the borehole shape and size (610) involves computing a parameter associated with the measured borehole shape following identification of a matching catalog shape (624). In various embodiments, borehole shape and size measurements are performed substantially in real time during a drilling operation, which generally means that matching shapes are identified (at least on average) at the same rate as borehole-shape data is acquired, and immediately upon data acquisition (e.g., before the next cross-sectional shape is measured, or with a delay that does not exceed a few (e.g., three or four) such successive measurements).

The downhole characterization of the borehole shape, e.g., as accomplished in the manner described above (with respect to actions 602 through 624), may be used in different ways. In some embodiments, data indicative of the identified matching catalog shape (such as the catalog identifier associated with the matching entry) and the determined size parameter(s) (e.g., the minimum (or nominal) radius of the borehole, and/or a parameter quantifying a feature of the particular borehole shape) are transmitted to a surface facility (e.g., the above-ground computer 410) using, for example, the telemetry module 412 (626). If the borehole shape and/or size have not substantially changed relatively to a previously identified borehole shape and size (e.g., if one or more parameters characterizing the shape and size deviate by less than 10%, or by less than 3%, or by less than 1% from their previous values), the transmitted data may simply include an indication to that effect (such as a predefined code signifying the absence of a change) to conserve bandwidth (628). To avoid superfluous communications, the data transmission may be suspended altogether when the measured borehole shape is "in gauge," i.e., matches a circular shape and has a diameter matching the diameter of the drill bit used during the drilling operation (within certain tolerance limits), and may be resumed once the borehole deviates again from the circular shape and size of the drill bit (630). Conversely, under certain circumstances (e.g., if more refined hole-shape characterization than afforded by comparison against the downhole catalog is needed), it may be beneficial to transmit the raw borehole-shape data to the surface, rather than merely the catalog identifier and size parameter.

At the surface, appropriate action may be taken in response to the measured borehole shape and size, either immediately or at a later time. For example, if the borehole shape indicates undesirable fracturing, cave-ins, etc., or generally deviates from the desired circular shape beyond a tolerable degree, the direction or speed of drilling, the drilling mud density, or some other drilling parameter may be adjusted to preserve the overall integrity of the borehole wall. The direction and size of a borehole breakout, for instance, provides insight into stresses on the borehole; based on such knowledge, the mud weight can be changed to allow for continued drilling while maintaining borehole stability. Borehole shape measurements may also be used to correct other downhole measurements communicated to the surface for the effect of standoff. For example, in the case of a rugose borehole, the mode of operation of a sonic tool may be changed to take measurements unaffected by this rugosity. The borehole shape and size may also be logged for subsequent use, e.g., to determine the volume of cement required to complete the borehole.

The measured borehole shape may also be used as feedback to the borehole shape measurement itself, i.e., the behavior of the well-logging tool 400 may be modified in some manner based on the determined borehole shape and size parameter. For example, the direction and angular extent of a breakout provide information about borehole stresses that can generally not be calculated through other means. Therefore, when a breakout is detected, the resolution of borehole shape measurements may be increased, azimuthally and/or in the direction along the axis of the borehole, to obtain sufficient data to calculate the downhole stresses. In the case of borehole rugosity, the quality of sonic dipole and quadrupole measurements is negatively affected, as these measurements rely on a good borehole quality (i.e., limited non-circularity). Accordingly, if rugosity beyond a certain tolerance is measured, the firing modes of the sonic caliper device may be modified, and dipole and quadrupole firings may be suspended to conserve battery and storage space on the well-logging tool, and prevent poor information from being transmitted to the surface and potentially relied upon. In addition to the sampling rate and firing operation mode of the caliper device(s), other operational parameters of the well-logging tool 400 and/or telemetry module 412, including, for instance, the amount and type of data to be transmitted to the surface, may be adjusted to increase the performance of the downhole system (including the tool 400 and/or other well-logging tools) and/or optimizing or improve the use of transmission bandwidth, power, memory, and/or downhole processing capabilities based on the measured borehole shape. In some embodiments, feedback to the well-logging tool 400 is provided not via control signals sent from the surface facility after receipt thereat of telemetered hole-shape data, but decisions to modify the behavior of the tool 400 are made downhole directly by the logic circuitry 404 of the tool 400 (e.g., more specifically, by the response module 436) (632). Furthermore, in some embodiments, the measured borehole shapes may be used to update and refine the catalog of borehole shapes in time. For instance, if the measured borehole shape repeatedly either fails to match any of the high-level shapes included in the catalog reasonably closely, or matches one of the high-level shapes but falls outside the parameter range covered in the catalog, templates for the non-covered shape may be added to the catalog.

In certain embodiments, the amount of data needed to transmit information about the borehole shape to the surface is reduced by a factor of two, three, or more, compared with the conventional direct transmission of the measured azimuthally binned radius or standoff data. While the latter may require, in some embodiments, about thirty to fifty bits of data per borehole shape, the same information can be conveyed, in some implementations hereof, in sixteen bits or less by simply transmitting a suitable catalog identifier for the identified matching catalog shape and the determined size parameter. Given a fixed bandwidth for data transmission to the surface, this facilitates more frequent updates of the borehole shape for timely decision-making, and/or makes more bandwidth available for sending other downhole information (e.g., as measured by other LWD/MWD tools) to the surface. Additionally, as described above, the catalog identifier and size parameter may be used to drive certain decisions, such as modifying the sample rate of the caliper device or otherwise changing the behavior of the caliper device and/or other downhole tools and sensors, directly in the downhole tool string, without a need to first process the data at the surface.

Many variations may be made in the structures and techniques described and illustrated herein without departing from the scope of the inventive subject matter. Accordingly, the scope of the inventive subject matter is to be determined by the scope of the following claims and all additional claims supported by the present disclosure, and all equivalents of such claims.

The invention claimed is:

1. A method, comprising:
   measuring a shape of a borehole with a well-logging tool to provide a measured borehole shape;
   using a processor and associated memory located downhole, (i) comparing the measured borehole shape against a catalog of hole shapes stored in the downhole memory so as to identify a matching catalog shape, and (ii) determining a size parameter associated with the measured borehole shape, wherein comparing the measured borehole shape against the catalog comprises sequentially comparing the measured borehole shape against a plurality of catalog shapes in an order that depends at least in part on complexity of the catalog shapes.

2. The method of claim 1, wherein the measuring comprises azimuthally sampling a cross-sectional parameter of the borehole.

3. The method of claim 1, wherein comparing the measured borehole shape against the catalog comprises computing, for each of a plurality of catalog entries specifying azimuthal data characteristic of a borehole shape, a metric indicative of a difference between the catalog data and the measured azimuthal data, and wherein identifying a matching catalog shape comprises selecting a catalog entry that minimizes the computed metric.

4. The method of claim 1, wherein comparing the measured borehole shape against the catalog comprises sequentially comparing the measured borehole shape against a plurality of catalog shapes in an order that depends at least in part on a matching catalog shape identified during a previous comparison.

5. The method of claim 1, wherein the comparing and computing steps are performed in substantially real time during a drilling operation.

6. The method of claim 5, further comprising transmitting data indicative of the identified matching catalog shape and the size parameter to a surface facility.

7. The method of claim 6, wherein the data indicative of the identified matching catalog shape comprises a catalog identifier associated therewith.

8. The method of claim 6, further comprising suspending transmission of the data when the measured borehole shape matches a circular shape and has a diameter matching a diameter of a drill bit used during the drilling operation.

9. The method of claim 6, wherein the data indicative of the identified matching catalog shape comprises an indication that the borehole shape has not substantially changed relative to a previously identified borehole shape.

10. The method of claim 1, further comprising modifying a behavior of a downhole tool based on at least one of the identified matching catalog shape or the size parameter.

11. The method of claim 10, wherein modifying the behavior comprises adjusting a sampling rate of the well-logging tool.

12. The method of claim 11, wherein modifying the behavior comprises adjusting an operation mode of the well-logging tool.

13. A well-logging tool, comprising:
    a caliper device for measuring a borehole shape to provide a measured borehole shape; and
    in communication with the caliper device, a processor and memory, the memory storing a catalog of hole shapes and instructions which, when executed by the processor, cause the processor to (i) compare the measured borehole shape against the catalog of hole shapes so as to identify a matching catalog shape, and (ii) compute a size parameter associated with the measured borehole shape, wherein comparing the measured borehole shape against the catalog comprises sequentially comparing the measured borehole shape against a plurality of catalog shapes in an order that depends at least in part on complexity of the catalog shapes.

14. The tool of claim 13, wherein the caliper device comprises an ultrasonic caliper.

15. The tool of claim 13, wherein the caliper device is configured to azimuthally sample a cross-sectional parameter of the borehole.

16. The tool of claim 13, wherein the catalog of hole shapes comprises entries for a plurality of high-level hole shapes.

17. The tool of claim 16, wherein the high-level hole shapes comprise at least two of a circle, a breakout shape, a rugose shape, a keyseating shape, and a cave-in shape.

18. The tool of claim 16, wherein the catalog comprises, for each high-level hole shape, a plurality of entries corresponding to a plurality of values of a parameter associated with the high-level hole shape.

19. The tool of claim 13, further comprising a telemetry module for transmitting data indicative of the identified matching catalog shape and the size parameter to a surface facility.

20. A method, comprising:
    measuring a shape of a borehole with a well-logging tool to provide a measured borehole shape;
    using a processor and associated memory located downhole, (i) comparing the measured borehole shape against a catalog of hole shapes stored in the downhole memory so as to identify a matching catalog shape, and (ii) determining a size parameter associated with the measured borehole shape, wherein comparing the measured borehole shape against the catalog comprises sequentially comparing the measured borehole shape against a plurality of catalog shapes in an order that depends at least in part on a matching catalog shape identified during a previous comparison.

* * * * *